United States Patent Office

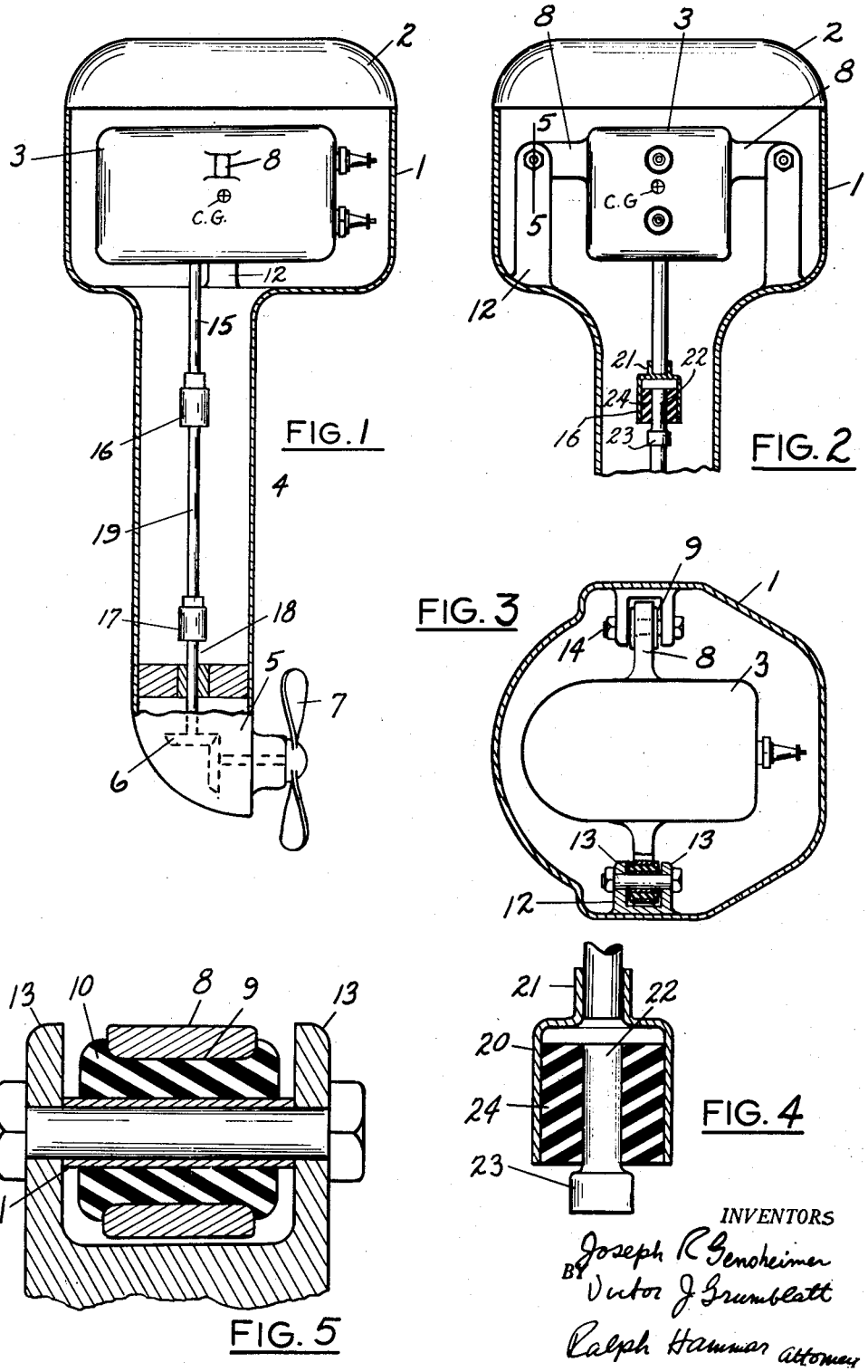

2,772,649
Patented Dec. 4, 1956

2,772,649

MOTOR MOUNTING SYSTEM

Joseph R. Gensheimer and Victor J. Grumblatt, Erie, Pa., assignors to Lord Manufacturing Company, Erie, Pa., a corporation of Pennsylvania Application June 1, 1954, Serial No. 433,760

7 Claims. (Cl. 115—.5)

This invention is intended to provide a motor mounting system having the torsional modes of vibrations isolated by mountings arranged about the torque axis and having a flexible coupling connected to the motor shaft and assisting in the isolation of rocking modes of vibrations of the motor about axes transverse to the torque axis. A preferred application is to outboard motors when the mounting system is independent of propeller thrust.

In the drawings, Fig. 1 is a sectional side elevation of an outboard motor; Fig. 2 is a fragmentary sectional front elevation; Fig. 3 is a top plan view with the cover for the motor housing removed; Fig. 4 is a section through one of the flexible couplings; and Fig. 5 is a section on line 5—5 of Fig. 2.

In the simplified illustration of the motor mounting system as applied to an outboard motor, the conventional parts of the outboard motor are readily identified, 1 being the motor housing having a removable cover 2 providing access to the motor 3, 4 being the drive shaft housing usually integral with and depending from the motor housing and having at the lower end a gear box 5 with a bevel gear drive 6 to the propeller 7. The parts so far described are or may be of common construction and may differ substantially in appearance from the diagrammatic illustration.

Extending from opposite sides of the motor 3 are brackets 8 terminating in sockets 9 in each of which is pressed a rubber bushing 10 having its center bonded to a metal sleeve 11. The rubber bushings 10 extend in a fore and aft direction or tangentially to a circle centered on the torque axis and at or close to the horizontal plane of the center of gravity of the motor. The motor housing 1 has supporting brackets 12 which terminate in spaced ears 13 through which extend bolts 14 which also extend through the metal sleeves 11 and fasten the sleeves to brackets 12. Since the inner surfaces of the rubber bushings 10 are secured to the brackets 12 through the sleeves 11 and the outer surfaces of the bushings 10 are secured to the motor through the sockets 9, torsional vibration of the motor about the axis of its crankshaft 15 (the torque axis) is accommodated by shear of the rubber bushings 10 in an axial direction. Since the rubber bushings can be located at a small distance or radius from the axis of the crankshaft 15, a low torsional spring rate can be provided which improves the torsional vibration isolation. Vertical and lateral shock loads are accommodated by compression of the rubber bushings between the metal sleeves 11 and the sockets 9 and accordingly provide a stiffer support in these directions which is desirable in order to provide stability to the engine support. The gravity load is likewise carried by compression of the rubber. The engine stability is also aided by location of the mountings at or substantially at the horizontal plane including the center of gravity of the motor.

In addition there is a rocking mode of vibration in the nature of pitch about a horizontal axis transverse to the torque axis due to piston and crankshaft unbalance. The rocking mode of vibration is in part resisted by the cocking stiffness of the bushings 10 which resist rocking of the motor brackets 8 relative the motor housing brackets 12. Because the bushings 10 are quite short, the resistance to this rocking movement can be kept at a relatively low value. Additional control for the rocking modes of vibration is obtained by one or more flexible couplings 16, 17 arranged between the motor crankshaft 15 and a shaft 18 journaled in the gear box 5. When two couplings 16, 17 are used, there is an intermediate shaft 19 transmitting the drive between the couplings. Each of the couplings as illustrated in Fig. 4 comprises an outer sleeve 20 having a hub 21 for attachment to the driving member and an inner sleeve 22 terminating in a hub 23 for attachment to the driven member. The inner and outer sleeves 22, 20 are concentric and are bonded respectively to the inner and outer surfaces of a rubber bushing 24. By selecting the length of the rubber bushings 24 and the position of the couplings 16 and 17 the resilient resistance to rocking movement of the motor 3 can be controlled so as to produce the desired isolation of the rocking frequencies. The flexible couplings accordingly have not only the usual function of accommodating misalignment but also aid in vibration isolation.

The internal resilience of the flexible couplings 16, 17 is not the sole factor contributing to the isolation of rocking modes of vibration. As the motor 3 rocks, the swinging of the shaft 15 introduces a tension along the shaft axis as the shaft 15 swings out of a straight line position between it and the shaft 18 which applies a compression force to the bushings 10. Accordingly, even if the couplings 16, 17 had negligible internal resilience, there would still be resilient resistance to the rocking modes of vibration due to the couplings.

It will be noted that the thrust of the propeller 7 or any other force external to the motor housing has no effect on the mounting system. This is a major problem when mounting an outboard motor in the conventional manner, i. e. by interposing mountings between the motor housing 1 and a bracket which attaches to the boat.

The bushings 10 are relatively soft in the torsional and fore and aft directions and are quite stiff in vertical and lateral directions. This means that vertical and lateral modes of vibration are not isolated but these are not important in outboard motors. If the vertical or lateral modes of vibration were of sufficient magnitude to require isolation, that could be accomplished by changing the bushings 10 to some other known form of mounting have softness in either the vertical or lateral directions.

What is claimed as new is:

1. A mounting system for an outboard motor having a housing having at its upper end a support for a vertical shaft motor and a depending vertical tubular section connected at its lower end to a gear casing for the propeller shaft, the housing with the tubular section and gear case comprising a structural unit, a pair of resilient mountings on opposite sides of the motor connected in load carrying relation between the motor and its support, a vertical driven shaft in the gear case, and a power transmitting connection between the motor and driven shafts extending through and spaced from the tubular section of the housing and including a flexible coupling of resilient material supplementing the mountings in resiliently resisting rocking of the motor about a horizontal axis.

2. The mounting system of claim 1 in which the mountings are arranged in a horizontal plane substantially at the center of gravity of the motor.

3. The mounting system of claim 1 in which the resilient mountings comprise a pair of tubular bushings of resilient material directed tangentially about the motor axis and having one of the inner and outer surfaces thereof connected to the support and the other of the surfaces connected to the motor.

4. The mounting system of claim 3 in which the bushings extend fore and aft of the motor.

5. A mounting system for an outboard motor having a housing having at its upper end an open topped casing for supporting the motor and a cover for the casing and a depending vertical tubular section connected at its lower end to a gear casing for the propeller shaft, the housing with the tubular section and gear case comprising a structural unit, a pair of brackets in the casing on opposite sides of the motor, resilient mountings in the brackets connected in load carrying relation between the brackets and the motor, a vertical driven shaft in the gear case, and a power transmitting connection between the motor and driven shafts extending through and spaced from the tubular section of the housing and including a flexible coupling of resilient material supplementing the mountings in resiliently resisting rocking of the motor about a horizontal axis.

6. A mounting system for a motor having a shaft and torsional vibrations about the axis of the motor shaft and rocking vibrations about an axis crosswise of the motor shaft axis comprising, a support, a driven shaft journaled in the support on the axis of the motor shaft and spaced from the motor, a pair of resilient mounting means respectively located on opposite sides of the motor shaft axis and connected between a stationary part of the motor and the support for cushioning torsional vibrations, said mounting means providing an effective two point support for the motor, and a third point support for the motor comprising a flexible coupling connected between the motor and driven shafts.

7. A mounting system for a motor having a shaft and torsional vibrations about the axis of the motor shaft and rocking vibrations about an axis crosswise of the motor shaft axis comprising a support, a driven shaft journaled in the support spaced from the motor, resilient mounting means connected between the motor and support for cushioning torsional vibrations, and flexible coupling means connecting the motor and the driven shaft and having resilience in a direction crosswise of the driven shaft for supplementing the mounting means in resiliently resisting rocking of the motor about an axis crosswise of the motor shaft axis, said flexible coupling means including a shaft intermediate the motor and the driven shaft with a flexible coupling at each end thereof.

References Cited in the file of this patent

UNITED STATES PATENTS

| | | |
|---|---|---|
| 2,118,550 | D'Aubarede | May 24, 1938 |
| 2,135,394 | Geissen | Nov. 1, 1938 |
| 2,151,146 | Petry | Mar. 21, 1939 |
| 2,272,900 | Saurer | Feb. 10, 1942 |
| 2,305,193 | Reynolds et al. | Dec. 15, 1942 |
| 2,585,774 | Heidner et al. | Feb. 12, 1952 |
| 2,661,969 | Thiry | Dec. 8, 1953 |
| 2,696,188 | Armstrong | Dec. 7, 1954 |